United States Patent
Toyota (10) Patent No.: US 9,507,144 B2
(45) Date of Patent: Nov. 29, 2016

(54) OPTICAL DEFLECTOR AND OPTICAL SCANNING DEVICE INCLUDING THE SAME

(71) Applicant: KYOCERA Document Solutions Inc., Osaka (JP)

(72) Inventor: Yuji Toyota, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/834,960

(22) Filed: Aug. 25, 2015

(65) Prior Publication Data

US 2016/0062108 A1  Mar. 3, 2016

(30) Foreign Application Priority Data

Aug. 28, 2014  (JP) .................... 2014-173388

(51) Int. Cl.
*G02B 26/08* (2006.01)
*G02B 26/10* (2006.01)

(52) U.S. Cl.
CPC ........... *G02B 26/105* (2013.01); *G02B 26/101* (2013.01); *G02B 26/0858* (2013.01)

(58) Field of Classification Search
CPC .............. G02B 26/105; G02B 26/101; G02B 26/0858; G02B 26/08; G02B 26/10; G02B 26/0833; G02B 26/0841; G02B 26/085
USPC ........................................... 359/198.1–226.1
See application file for complete search history.

(56) References Cited

U.S. PATENT DOCUMENTS

| | | | |
|---|---|---|---|
| 8,174,746 B2 * | 5/2012 | Miyagawa | ........... G02B 26/105 359/224.1 |
| 2010/0149612 A1 | 6/2010 | Miyagawa et al. | |

FOREIGN PATENT DOCUMENTS

| | | |
|---|---|---|
| JP | 2004-20752 | 1/2004 |
| JP | 2009-42737 | 2/2009 |
| JP | 2009-154264 | 7/2009 |
| JP | 2011-123176 | 6/2011 |
| JP | 2014-95837 | 5/2014 |

* cited by examiner

*Primary Examiner* — Euncha Cherry
(74) *Attorney, Agent, or Firm* — Wenderoth, Lind & Ponack, L.L.P.

(57) ABSTRACT

An optical deflector includes a mirror unit and a support member. The mirror unit includes a vibration mirror part extending in a main scanning direction and a torsion bar part extending in a direction crossing the main scanning direction and supporting the vibration mirror part. The support member supports the mirror unit. The support member has a pair of solid parts. The pair of solid parts are arranged adjacent to the circumferential side surfaces of both end portions of the vibration mirror part in the main scanning direction and suppress a vortex generated when the vibration mirror part vibrates. The optical deflector further includes a positioning mechanism which performs positioning of the mirror unit for the support member so that a clearance distance between each solid part and the circumferential side surfaces of both end portions of the vibration mirror part becomes a preset setting distance.

7 Claims, 9 Drawing Sheets

OPTICAL DEFLECTOR AND OPTICAL SCANNING DEVICE INCLUDING THE SAME

CROSS-REFERENCE TO RELATED APPLICATION

This application is based upon and claims the benefit of priority from Japanese Patent Application No. 2014-173388 filed on Aug. 28, 2014, the entire contents of which are incorporated herein by reference.

BACKGROUND

The technology of the present disclosure relates to an optical deflector and an optical scanning device including the same.

Conventionally, there has been known a resonance type optical deflector including a vibration mirror part, a torsion bar part that supports the vibration mirror part, and a driving part that drives the vibration mirror part. In this type of optical deflector, the vibration mirror part and the torsion bar part are unitized and are supported by a support member. In this optical deflector, when the vibration mirror part vibrates, the behavior (amplitude) of the vibration mirror part may be unstable due to a vortex generated around the vibration mirror part. In order to solve such a problem, there has been proposed a technology in which a solid part is arranged adjacent to an end portion of the vibration mirror part, so that the generation of the aforementioned vortex is suppressed.

A driving scheme of the aforementioned vibration mirror part includes an electromagnetic driving scheme, and a piezoelectric driving scheme using a piezoelectric element. In an optical deflector employing the piezoelectric driving scheme, a vibration mirror part, a torsion bar part, and a piezoelectric element (a driving part) are unitized to configure a mirror unit.

SUMMARY

An optical deflector according to one aspect of the present disclosure includes a mirror unit and a support member. The mirror unit includes a vibration mirror part extending in a main scanning direction and a torsion bar part extending in a direction crossing the main scanning direction and supporting the vibration mirror part so as to be swingable. The support member supports the mirror unit.

Furthermore, the aforementioned support member is provided with a pair of solid parts arranged adjacent to the circumferential side surfaces of both end portions of the vibration mirror part in the main scanning direction and suppressing a vortex generated at a time of vibration of the vibration mirror part, and a positioning mechanism that performs positioning of the mirror unit for the support member is provided such that a clearance distance between each solid part and the circumferential side surfaces of both end portions of the vibration mirror part is a preset setting distance.

An optical scanning device according to one aspect of the present disclosure includes the optical deflector, a light source, an image forming lens, and a housing. The light source emits light toward the optical deflector. The image forming lens forms an image of light deflected by the optical deflector on a surface to be scanned. The housing accommodates the image forming lens.

Furthermore, the positioning mechanism serves as a positioning mechanism that performs positioning of the optical deflector for the housing.

DETAILED DESCRIPTION

Hereinafter, the present embodiments will now be described in detail with reference to the drawings. The technology of the present disclosure is not limited to the following embodiments.

Embodiment 1

Figure 1:
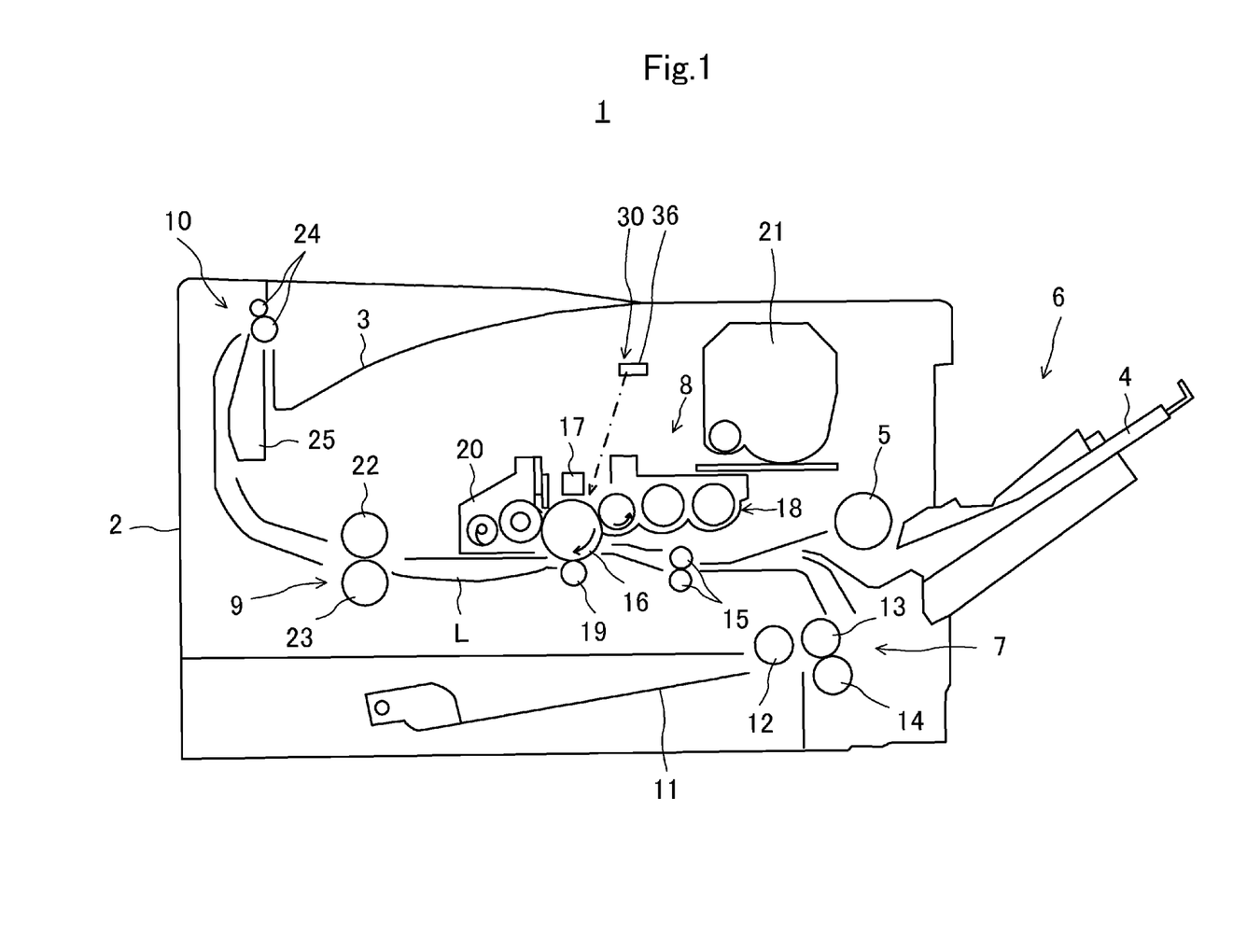
FIG. 1 is a longitudinal sectional view illustrating an image forming apparatus including an optical deflector in an embodiment.

FIG. 1 is a sectional view illustrating a schematic configuration of a laser printer 1 as an image forming apparatus in the present embodiment.

As illustrated in FIG. 1, the laser printer 1 includes a box-like printer body 2, a manual paper feeding unit 6, a cassette paper feeding unit 7, an image forming unit 8, a fixing unit 9, and a paper discharge unit 10. Accordingly, the laser printer 1 is configured to form an image on a paper on the basis of image data transmitted from a terminal and the like (not illustrated) while conveying the paper along a conveyance path L in the printer body 2.

The manual paper feeding unit 6 has a manual tray 4 provided at one side portion of the printer body 2 so as to be openable and closable, and a manual paper feeding roller 5 rotatably provided inside the printer body 2.

The cassette paper feeding unit 7 is provided at a bottom portion of the printer body 2. The cassette paper feeding unit has a paper feeding cassette 11 that accommodates a plurality of stacked papers, a picking roller 12 that takes out the papers in the paper feeding cassette 11 one by one, and a feed roller 13 and a retard roller 14 that separate the taken-out papers one by one and send the separated paper to the conveyance path L.

The image forming unit 8 is provided above the cassette paper feeding unit 7 in the printer body 2. The image forming unit 8 includes a photosensitive drum 16 serving as an image carrying member rotatably provided in the printer body 2, and a charging device 17, a developing unit 18, a transfer roller 19, a cleaning unit 20, an optical scanning device 30, and a toner hopper 21 arranged in the vicinity of the photosensitive drum 16, wherein the optical scanning device 30 is arranged above the photosensitive drum 16. Accordingly, the image forming unit 8 is configured to form an image on a paper supplied from the manual paper feeding unit 6 or the cassette paper feeding unit 7.

The conveyance path L is provided with a pair of resist rollers 15 that allow sent papers to be temporarily waiting and then supply the papers to the image forming unit 8 at a predetermined timing.

The fixing unit 9 is arranged at a lateral side of the image forming unit 8. The fixing unit 9 includes a fixing roller 22 and a pressing roller 23 brought into press-contact with each other and rotating together with each other. Accordingly, the fixing unit 9 is configured to fix a toner image, which has been transferred to a paper in the image forming unit 8, to the paper.

The paper discharge unit 10 is provided above the fixing unit 9. The paper discharge unit 10 includes a paper discharge tray 3, a pair of paper discharge rollers 24 for conveying a paper to the paper discharge tray 3, and a plurality of conveyance guide rib parts 25 for guiding the paper to the paper discharge roller pair 24. The paper discharge tray 3 is formed in a concave shape at an upper portion of the printer body 2.

When the laser printer 1 receives image data, the photosensitive drum 16 is rotationally driven and the charging device 17 electrifies the surface of the photosensitive drum 16 in the image forming unit 8.

Next, on the basis of the image data, laser light is emitted to the photosensitive drum 16 from the optical scanning device 30. The laser light is irradiated onto the surface of the photosensitive drum 16, so that an electrostatic latent image is formed. The electrostatic latent image formed on the photosensitive drum 16 is developed in the developing unit 18, so that the electrostatic latent image becomes a visible image as a toner image.

Then, the paper passes through between the transfer roller 19 and the photosensitive drum 16. At this time, the toner image of the photosensitive drum 16 is transferred to the paper by a transfer bias applied to the transfer roller 19. The paper with the transferred toner image is heated and pressed by the fixing roller 22 and the pressing roller 23 in the fixing unit 9. As a consequence, the toner image is fixed to the paper.

The optical scanning device 30 has an optical deflector 35 and a housing 36. The optical deflector 35 is accommodated in the housing 36, and deflects and scans light emitted from a light source. The light deflected and scanned by the optical deflector 35 passes through an opening of the housing 36 and is irradiated to a peripheral surface of the photosensitive drum 16.

Figure 2:
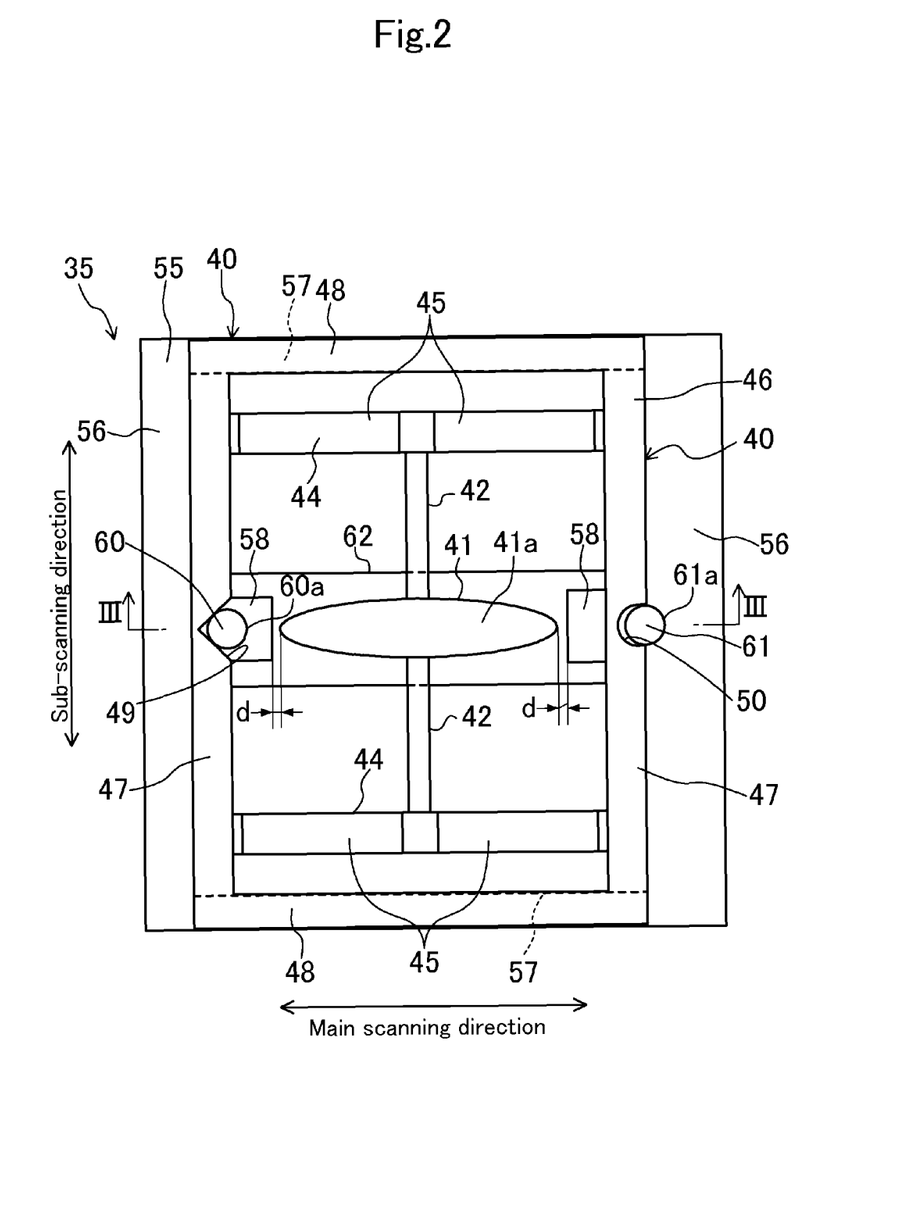
FIG. 2 is a plan view illustrating an optical deflector.

As illustrated in FIG. 2, the optical deflector 35 includes a mirror unit 40 and a board (corresponding to a support member) 55. The mirror unit 40 is a so-called MEMS (Micro Electro Mechanical System) device, and is formed by etching a silicon plate.

The mirror unit 40 has a vibration mirror part 41, a pair of torsion bar parts 42, a pair of horizontal beam parts 44, and a fixed frame part 46. The mirror unit 40 is fixed to an upper surface of the board 55 via the fixed frame part 46.

The vibration mirror part 41 is formed in a thin plate shape having an approximately oval shape when viewed from a plan view. A long axis direction of the vibration mirror part 41 coincides with a main scanning direction and a short axis direction of the vibration mirror part 41 coincides with a sub-scanning direction. One side surface of the vibration mirror part 41 in a thickness direction serves as a reflective surface 41a for reflecting light emitted from the light source. The reflective surface 41a is provided with a light reflective film made of, for example, aluminum or chrome, in order to enhance light reflectance.

The fixed frame part 46 is formed to surround a periphery of the vibration mirror part 41. In detail, the fixed frame part 46 is formed in a rectangular frame shape having two longitudinal side portions 47 extending in the sub-scanning direction and two transverse side portions 48 extending in the main scanning direction.

The pair of horizontal beam parts 44 are arranged at both sides of the sub-scanning direction with respect to the vibration mirror part 41. Each horizontal beam part 44 is arranged across between the two longitudinal side portions 47 of the fixed frame part 46. The vibration mirror part 41 is supported to the fixed frame part 46 via the pair of torsion bar parts 42 and the pair of horizontal beam parts 44. The pair of torsion bar parts 42 extend in the sub-scanning direction and are positioned on an extension line of a short axis of the vibration mirror part 41.

Two piezoelectric elements 45 are mounted at each horizontal beam part 44, so that the total four piezoelectric elements 45 are provided. Each piezoelectric element 45 is electrically connected to a driving circuit formed in the board 55. Furthermore, an applied voltage (a driving voltage) applied to each piezoelectric element 45 by the driving circuit is changed to a predetermined frequency, so that each piezoelectric element 45 is extended and retracted for vibration. A vibration frequency of each piezoelectric element 45 is set to coincide with a resonance frequency of the vibration mirror part 41.

As each piezoelectric element 45 vibrates, the vibration mirror part 41 resonates and torsionally vibrates around the aforementioned both torsion bar parts 42. Accordingly, the vibration mirror part 41 changes a reflective direction of light incident into the reflective surface 41a from the light source and thus reciprocally scan the light in the main scanning direction.

Figure 3:
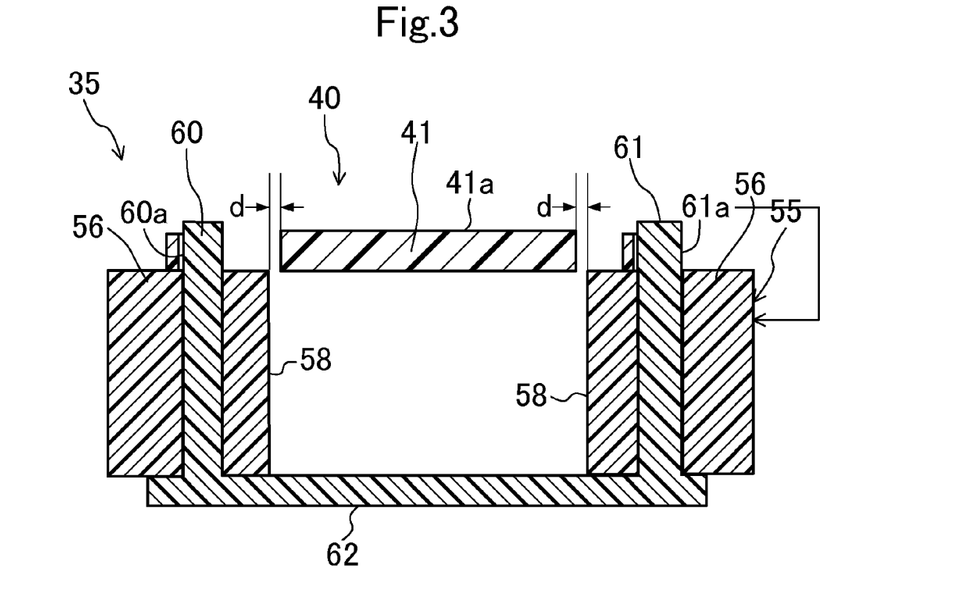
FIG. 3 is a sectional view taken along line III-III of FIG. 2.

The board 55 is formed to have a sectional column shape having a rectangular frame shape. In detail, the board 55 has a pair of longitudinal side portions 56 extending in the sub-scanning direction and a pair of transverse side portions 57 extending in the main scanning direction. The fixed frame part of the mirror unit 40 is fixedly supported to an upper surface of the board 55.

At a center portion of the pair of longitudinal side portions 56 in the sub-scanning direction, projection bar parts (corresponding to a solid part) 58 protruding inward in a rectangular shape are formed. The projection bar part 58 constitutes a part of the board 55 and is formed across the entire board 55 in a height direction of the board 55. The projection bar parts 58 are formed so as to be adjacent to the circumferential side surfaces of both end portions of the vibration mirror part 41 in the main scanning direction when viewed from a plan view. Each projection bar part 58 allows a vortex generated from both end portions of the vibration mirror part 41 at the time of vibration of the vibration mirror part 41 to disappear. Accordingly, the behavior (amplitude) of the vibration mirror part 41 may be stable so that the scanning accuracy of light can be enhanced.

Herein, when a clearance distance d between both end portions of the vibration mirror part 41 in the main scanning direction and the projection bar part 58 is too wide, there is a problem that it is not possible to sufficiently suppress the vortex by the projection bar part 58. In this regard, in the present embodiment, a positioning mechanism is provided to perform the positioning of the mirror unit 40 for the board 55.

In detail, the aforementioned positioning mechanism has a first positioning pin 60, a second positioning pin 61, a first pin engagement concave part 49, and a second pin engagement concave part 50.

The first positioning pin 60 passes through one projection bar part 58 of the board 55 and the second positioning pin 61 passes through the other projection bar part 58 of the board 55. Each of the positioning pins 60 and 61 is positioned on an extension line of a long axis of the vibration mirror part 41. One end portion of each of the positioning pins 60 and 61 protrudes upward from an upper surface of the board 55 constitutes protruding portions 60a and 61a. The other end portions of both positioning pins 60 and 61 are connected to each other by a connection plate part 62.

The first pin engagement concave part 49 is formed at one longitudinal side portion 47 of the fixed frame part 46. The first pin engagement concave part 49 is formed by cutting off a center portion of end edges of an inner side (the vibration mirror part 41 side) of the longitudinal side portion 47 in the sub-scanning direction in a V shape. An inner side surface of the first pin engagement concave part 49 abuts the protruding portion 60a of the first positioning pin 60, so that the positioning of the mirror unit 40 in the main scanning direction is achieved.

The second pin engagement concave part 50 is formed at the other longitudinal side portion 47 of the fixed frame part 46. The second pin engagement concave part 50 is formed by cutting off a center portion of end edges of an inner side (the vibration mirror part 41 side) of the longitudinal side portion 47 in the sub-scanning direction in an U shape. A diameter of the U shape is equal to or slightly larger than a diameter of the second positioning pin 61. Both side surfaces of the second pin engagement concave part 50 in the sub-scanning direction abut the protruding portion 61a of the first positioning pin 61, so that the positioning of the mirror unit 40 in the sub-scanning direction is achieved.

When the mirror unit 40 is assembled to the board 55, the first pin engagement concave part 49 formed at the fixed frame part 46 of the mirror unit 40 is allowed to be engaged with the protruding portion 60a of the first positioning pin 60, and the second pin engagement concave part 50 is allowed to be engaged with the protruding portion 61a of the first positioning pin 61. In this way, the clearance distance d between each projection bar part 58 and the circumferential side surfaces of both end portions of the vibration mirror part 41 in the main scanning direction is restrained to a preset setting distance. Consequently, it is possible to prevent a vortex suppression effect by each projection bar part 58 from being reduced because the clearance distance becomes too wide. Thus, a vortex generated from the vicinity of both end portions of the vibration mirror part 41 is reliably made to disappear by each projection bar part 58, so that it is possible to stabilize the behavior (amplitude) of the vibration mirror part 41.

Furthermore, in the aforementioned embodiment, the first pin engagement concave part 49 is formed in a V shape and the second pin engagement concave part 50 is formed in an U shape, so that the movement of the fixed frame part 46 in the sub-scanning direction can be accurately restraint as compared with the case in which both pin engagement concave parts 49 and 50 are formed in a V shape, thereby further enhancing the positioning accuracy of the mirror unit 40 for the board 55. Accordingly, the clearance distance d between each projection bar part 58 and the circumferential side surfaces of both end portions of the vibration mirror part 41 in the main scanning direction can be accurately matched with the preset setting distance.

Furthermore, in the aforementioned embodiment, the projection bar parts 58 for suppressing the aforementioned vortex are integrally formed with the board 55 as a part of the board 55, so that it is possible to reduce the number of parts and thus reduce the entire cost of the apparatus.

Furthermore, in the aforementioned embodiment, the first positioning pin 60 and the second positioning pin 61 are connected to each other by the connection plate part 62. Consequently, the first positioning pin 60 and the second positioning pin 61 can be assembled to the board 55 at one time. Thus, it is possible to facilitate an assembly work of the positioning pins 60 and 61 to the board 55.

—Modification 1—

Figure 4:
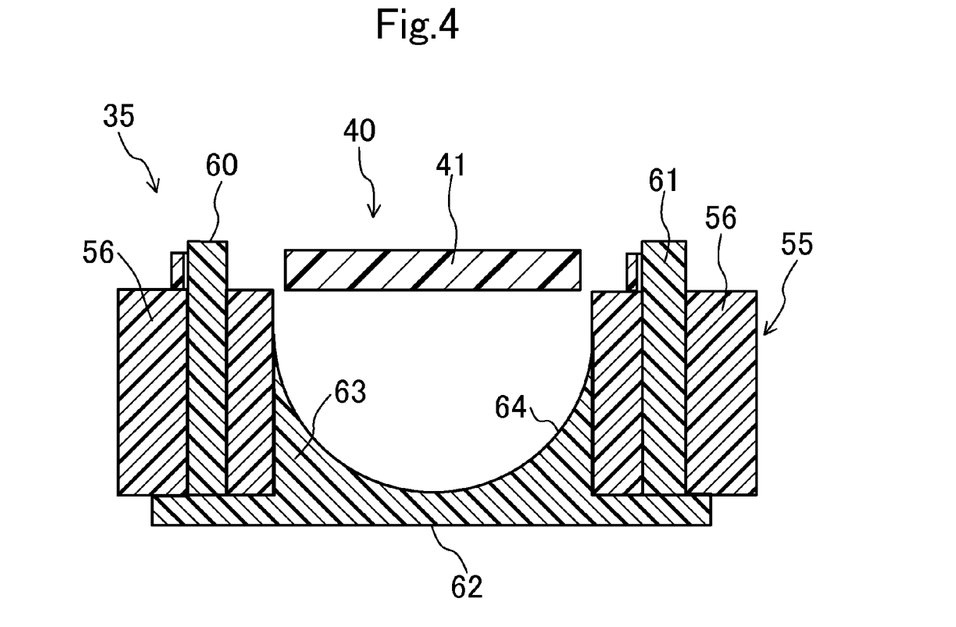
FIG. 4 is a view corresponding to FIG. 3, which illustrates a modification 1.

FIG. 4 illustrates a modification 1. The modification 1 is different from the aforementioned embodiment 1 in that the connection plate part 62 is provided at an upper surface thereof with an arch forming part 63. In the following modification and embodiments, the same reference numerals are used to designate the same elements as those of the embodiment 1, and a detailed description thereof will be omitted.

The aforementioned arch forming part 63 forms an arch surface (a cylindrical surface) 64 following a trajectory of both end portions of the vibration mirror part 41 in the main scanning direction. According to such a configuration, although the clearance distance between both end portions of the vibration mirror part 41 and each projection bar part 58 has been wide because the vibration mirror part 41 torsionally vibrates around the torsion bar part 42 from a horizontal state, a clearance distance between both end portions of the vibration mirror part 41 and the arch surface 64 of the arch forming part 63 is constantly held. Thus, a vortex generated from both end portions of the vibration mirror part 41 can be suppressed by the arch forming part 63.

—Modification 2—

Figure 5:
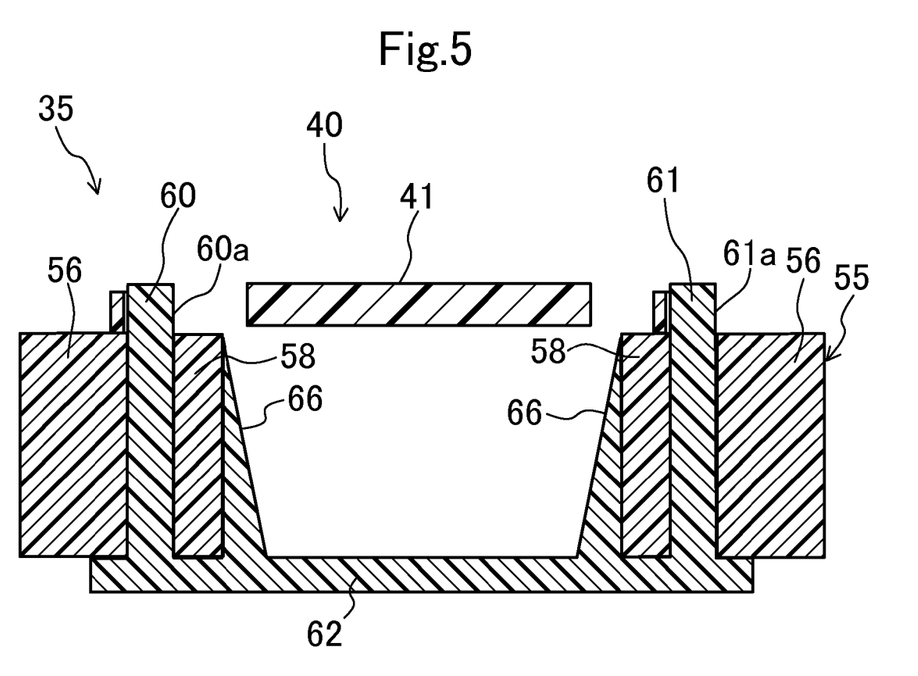
FIG. 5 is a view corresponding to FIG. 3, which illustrates a modification 2.

FIG. 5 illustrates a modification 2. The modification 2 is different from the aforementioned embodiment 1 in that the connection plate part 62 is provided at an upper surface thereof with a pair of inclined surfaces 66.

The aforementioned pair of inclined surfaces 66 are inclined upward toward the outside from a center side in the main scanning direction. According to such a configuration, although the clearance distance between both end portions of the vibration mirror part 41 and each projection bar part 58 has been wide because the vibration mirror part 41 torsionally vibrates around the torsion bar part 42 from a horizontal state, a clearance distance between both end portions of the vibration mirror part 41 and each inclined surface 66 is not significantly changed. Thus, a vortex generated from both end portions of the vibration mirror part 41 can be suppressed by the inclined surfaces 66.

In addition, in the present modification 2, since it is not necessary to form the arch surface 64 as with the modification 1, the manufacturing is easy as compared with the modification 1.

Embodiment 2

Figure 6:
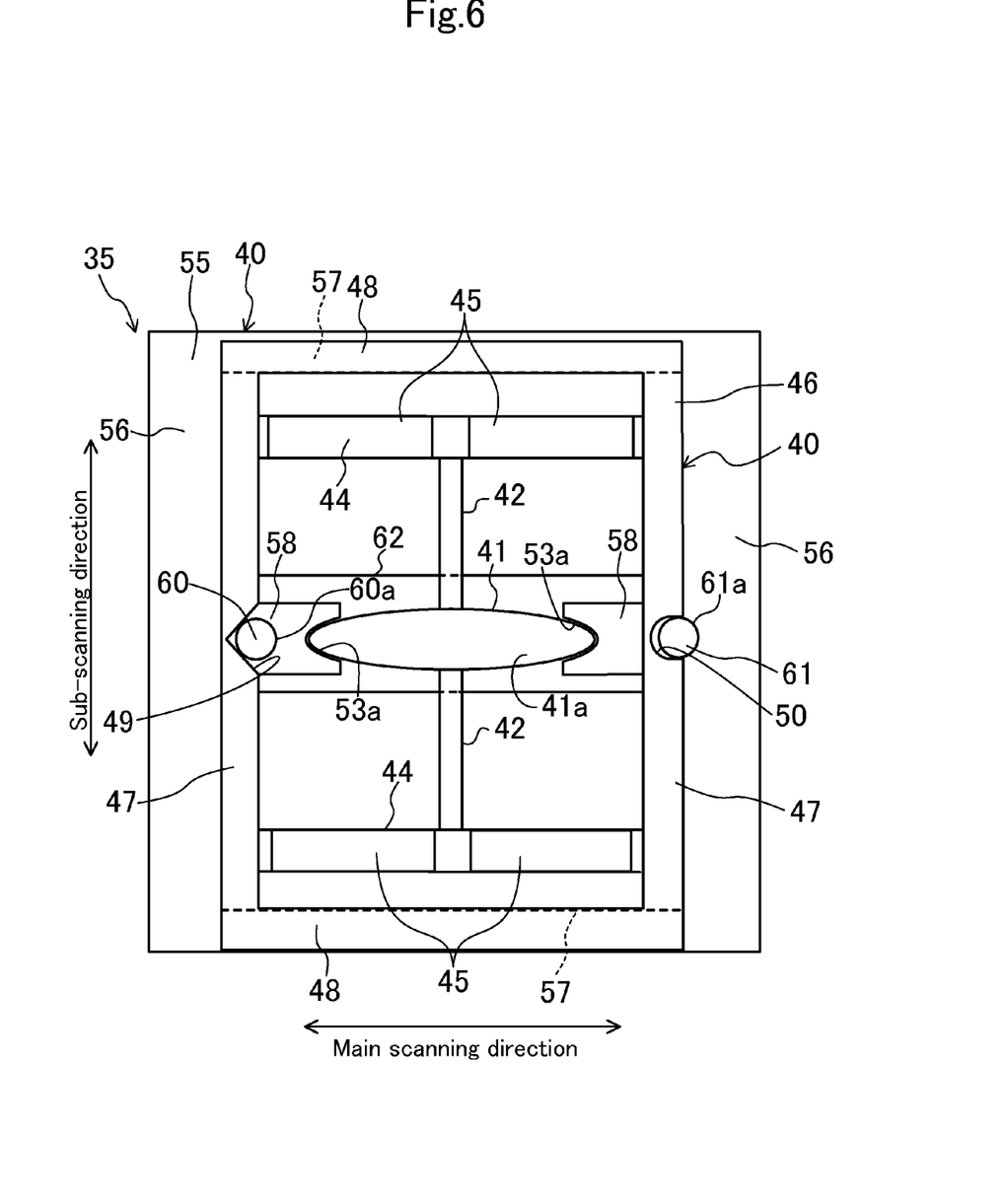
FIG. 6 is a view corresponding to FIG. 2, which illustrates an embodiment 2.

FIG. 6 illustrates an embodiment 2. The present embodiment 2 is different from the aforementioned embodiment 1 and each modification in terms of the shape of the projection bar part 58.

That is, end surfaces 53a (that is, surfaces of the projection bar parts 58 facing both end portions of the vibration mirror part 41) of protruding sides in the projection bar parts 58 are formed to surround the circumferential side surfaces of both end portions of the vibration mirror part 41 when viewed from a direction vertical to the reflective surface 41*a* in a state (a neutral state) in which there is no torsion of the vibration mirror part 41. A clearance distance between the circumferential side surface and the end surface 53*a* of the projection bar part 58 is constant in any places of the circumferential side surface.

According to such a configuration, there is no change in the clearance distance between the projection bar part 58 and the circumferential side surface of the end portion of the vibration mirror part 41, so that it is possible to constantly maintain the clearance distance at all times. Thus, it is possible to avoid a problem that a vortex is easily generated at a place at which the clearance distance is long, thereby enhancing a vortex suppression effect by the projection bar part 58 as much as possible.

Embodiment 3

Figure 7:
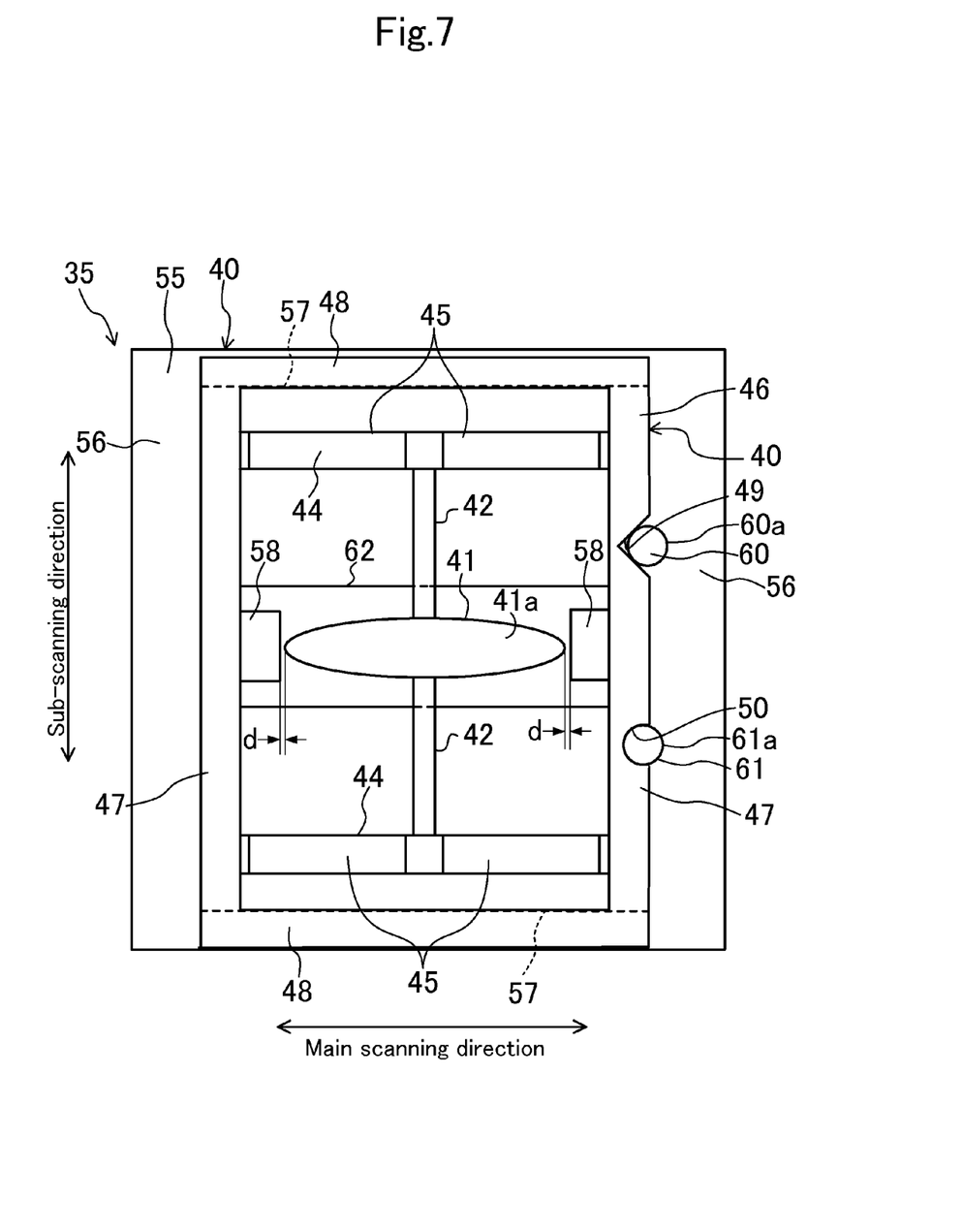
FIG. 7 is a view corresponding to FIG. 2, which illustrates an embodiment 3.

FIG. 7 illustrates an embodiment 3. The present embodiment 3 is different from the aforementioned each embodiment and each modification in terms of the arrangement of the first positioning pin 60 and the second positioning pin 61.

That is, in the present embodiment 3, both the first positioning pin 60 and the second positioning pin 61 pass through the other (the right side of FIG. 7) longitudinal side portion 56 in the board 55. On the other hand, both the first pin engagement concave part 49 and the second pin engagement concave part 50 are formed at the other longitudinal side portion 47 in the fixed frame part 46 of the mirror unit 40.

Figure 8:
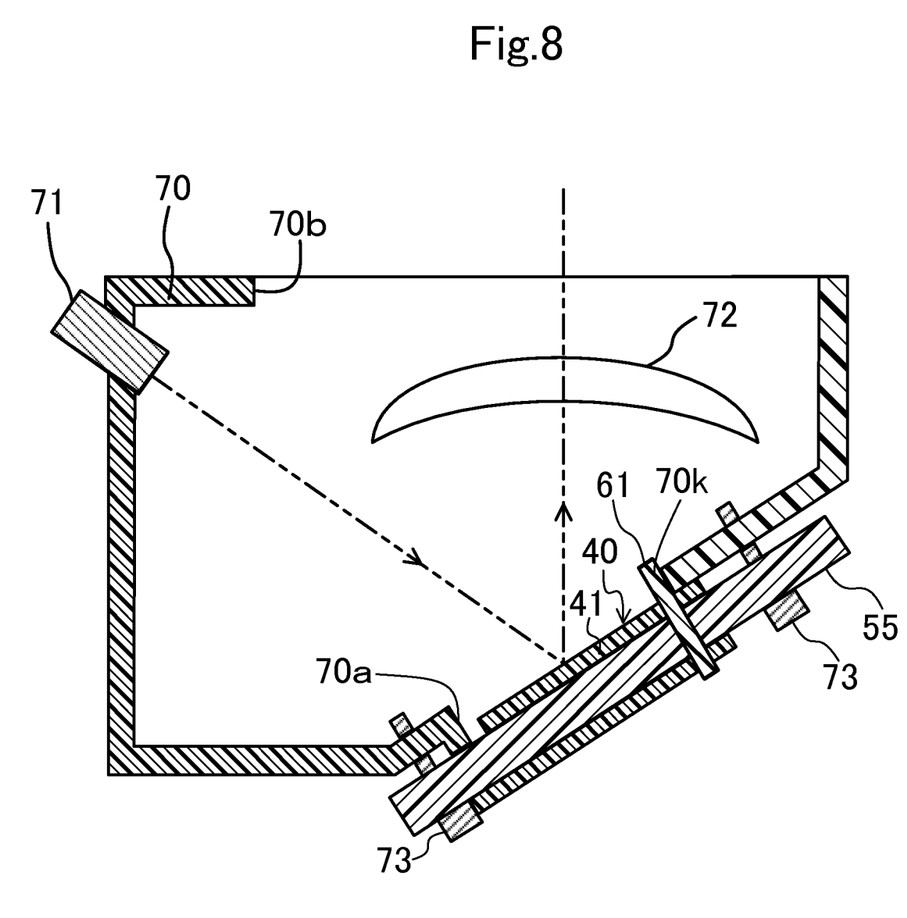
FIG. 8 is a schematic sectional view illustrating an optical scanning device including an optical deflector in an embodiment 3.

FIG. 8 illustrates the optical scanning device 30 including the optical deflector 35 in the present embodiment 3. The optical scanning device 30 has a housing 70 having a sectional trapezoid shape. The housing 70 is formed at a sidewall portion thereof with a rectangular mounting opening 70*a* for mounting the optical deflector 35. The optical deflector 35 is fixed to the sidewall portion of the housing 70 by a bolt 73 passing through the board 55. The mirror unit 40 is arranged in the housing 70 while facing the housing 70, and light emitted from a light source 71 is reflected by the vibration mirror part 41 of the mirror unit 40 and is deflected and scanned in the main scanning direction. The scanned light is incident into a scanning lens (an image forming lens) 72 arranged in the housing 70, passes through a light passage opening 70*b*, and is exposed on the peripheral surface of the photosensitive drum 16. The scanning lens 72 serves as an image forming lens that forms an image of the light deflected by the optical deflector 35 on a surface to be scanned.

When a worker assembles the optical deflector 35 with respect to the housing 70, the worker allows the first positioning pin 60 and the second positioning pin 61 to abut an inner wall surface 70*k* of the mounting opening 70*a*. Accordingly, the positioning of the optical deflector 35 for the housing 70 is performed, and then the optical deflector 35 is fixed to the housing 70 by the bolt 73.

Consequently, in the aforementioned embodiment 3, a positioning mechanism that performs the positioning of the mirror unit 40 for the board 55 and a positioning mechanism that performs the positioning of the optical deflector 35 for the housing 70 are commonly used. In this way, it is possible to reduce the entire cost of the optical scanning device.

Other Embodiments

Figure 9:
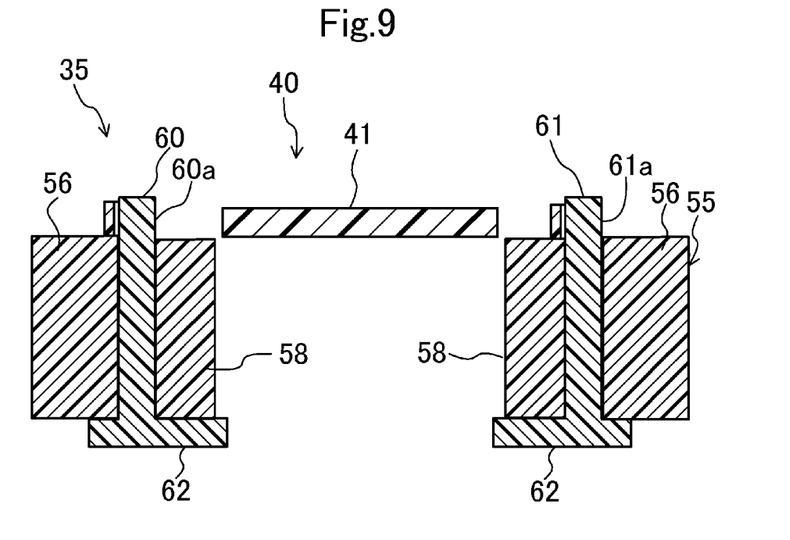
FIG. 9 is a view corresponding to FIG. 3, which illustrates another embodiment.
Figure 10:
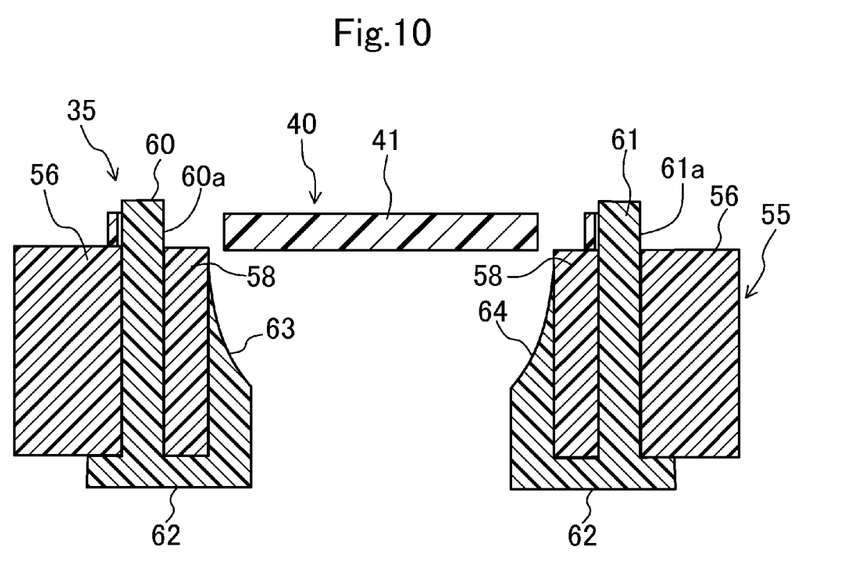
FIG. 10 is a view corresponding to FIG. 3, which illustrates another embodiment.

In the aforementioned each embodiment and each modification, the first positioning pin 60 and the second positioning pin 61 are connected to each other by the connection plate part 62. However, as illustrated in FIG. 9 and FIG. 10, the connection plate part 62 may also be divided into a side of the first positioning pin 60 and a side of the second positioning pin 61. In this way, when the ambient temperature of the optical deflector 35 has risen, it is possible to suppress a change in a relative position of both positioning pins 60 and 61 for the board 55 due to a difference between the linear expansion coefficients of the connection plate part 62 and the board 55.

Figure 11:
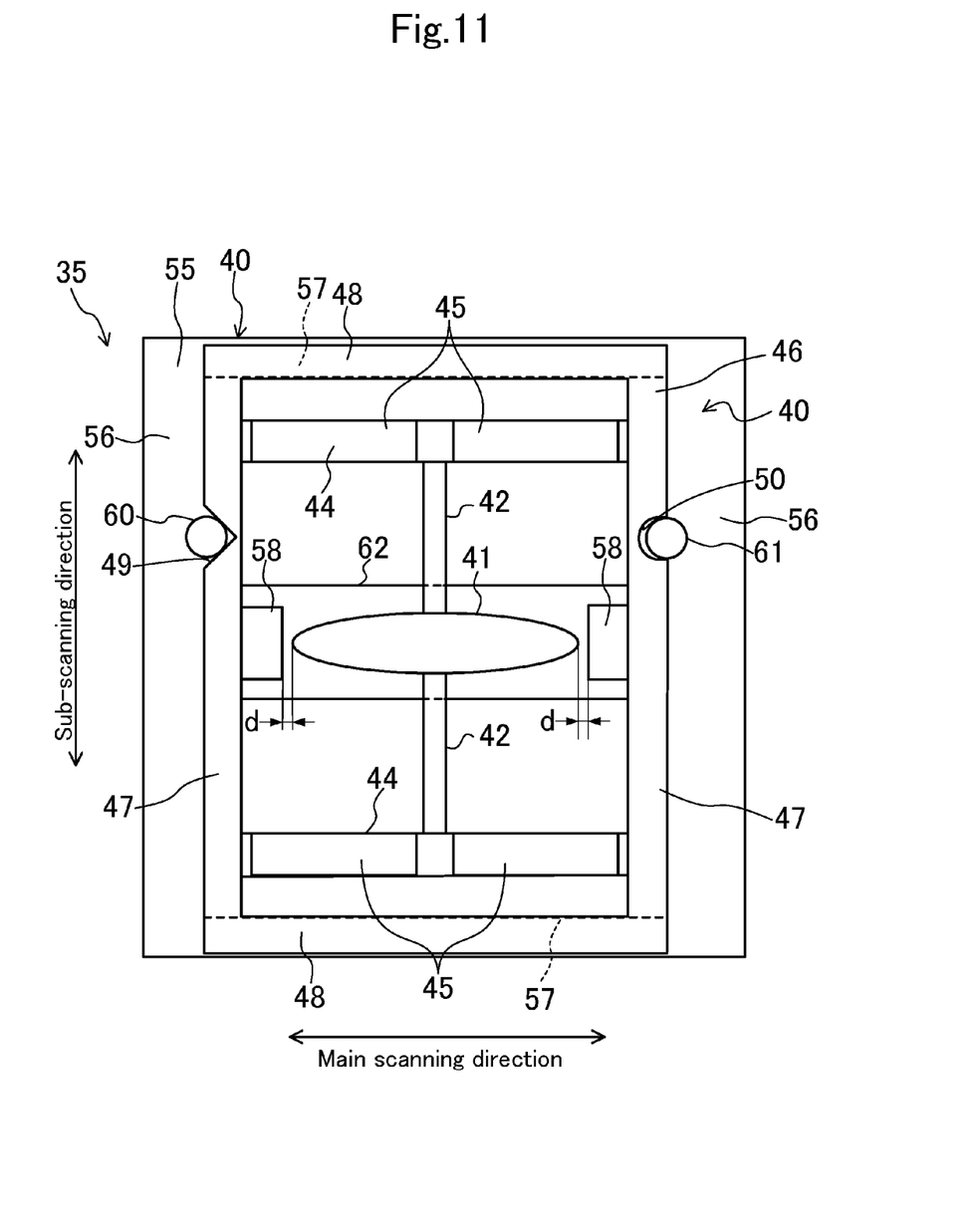
FIG. 11 is a view corresponding to FIG. 2, which illustrates another embodiment.

Furthermore, in the aforementioned embodiments, each of the positioning pins 60 and 61 is positioned on the extension line of the long axis of the vibration mirror part 41 when viewed from a plan view; however, the technology of the present disclosure is not limited thereto. For example, as illustrated in FIG. 11, each of the positioning pins 60 and 61 may also be arranged spaced apart from the extension line of the long axis of the vibration mirror part 41 in the sub-scanning direction.

Furthermore, in the aforementioned embodiments, a laser printer has been described as an example of the image forming apparatus 1; however, the technology of the present disclosure is not limited thereto, and the image forming apparatus 1 may also be a copy machine, a multifunctional peripheral, a scanner, a projector and the like.

Furthermore, in the aforementioned embodiments, the vibration mirror part 41 is resonantly driven by the piezoelectric element 45; however, the technology of the present disclosure is not limited thereto, and the vibration mirror part 41 may also be electromagnetically driven.

Furthermore, the technology of the present disclosure is not limited to the aforementioned each embodiment and modifications, and includes configurations obtained by appropriately combining the aforementioned each embodiment and each modification with one another.

What is claimed is:

1. An optical deflector comprising:
   a mirror unit including a vibration mirror part extending in a main scanning direction and a torsion bar part extending in a direction crossing the main scanning direction and supporting the vibration mirror part so as to be swingable; and
   a support member that supports the mirror unit,
   wherein the support member is provided with a pair of solid parts arranged adjacent to circumferential side surfaces of both end portions of the vibration mirror part in the main scanning direction and suppressing a vortex generated at a time of vibration of the vibration mirror part, and
   a positioning mechanism that performs positioning of the mirror unit for the support member is provided such that a clearance distance between each solid part and the circumferential side surfaces of both end portions of the vibration mirror part is a preset setting distance.

2. The optical deflector of claim 1, wherein surfaces of the solid parts facing both end portions of the vibration mirror part are formed to surround the circumferential side surfaces of both end portions when viewed from a direction vertical to a reflective surface of the vibration mirror part.

3. The optical deflector of claim 1, wherein the mirror unit comprises:
   a piezoelectric element that resonantly drives the vibration mirror part,
   wherein the support member is a board for supplying a driving voltage to the piezoelectric element.

4. The optical deflector of claim 1, wherein the mirror unit comprises:

a fixed frame part that is formed to surround a periphery of the vibration mirror part, holds the vibration mirror part via the torsion bar part, and is fixedly supported to the support member, wherein the positioning mechanism comprises:

a positioning pin having a protruding portion that protrudes from a support surface of the fixed frame part in the support member; and a pin engagement part formed at the fixed frame part and engaged with the protruding portion in the positioning pin.

5. The optical deflector of claim 4, wherein the positioning pin is provided in a plural number, and the optical deflector further comprises:

a connection part that connects the plurality of positioning pins to each other.

6. The optical deflector of claim 5, wherein the connection part includes a plate part that connects end portions opposite to the protruding portions of the positioning pins to each other, wherein the plate part is integrally formed with an arch surface forming part forming an arch surface curved so as to follow a trajectory of both end portions of the vibration mirror part in the main scanning direction.

7. An optical scanning device comprising:

the optical deflector of claim 1;

a light source that emits light toward the optical deflector;

an image forming lens that forms an image of light deflected by the optical deflector on a surface to be scanned; and a housing that accommodates the image forming lens, wherein the positioning mechanism serves as a positioning mechanism that performs positioning of the optical deflector for the housing.

* * * * *